3,709,943
PROCESS FOR THE ISOLATION OF D-ISOTHUJONE
Vladimir Hach, Vancouver, British Columbia, Robert
William Lockhart, Coquitlan, British Columbia, and
Dennis Murray Cartlidge, New Westminster, British
Columbia, Canada, assignors to MacMillan Bloedel
Limited, Vancouver, British Columbia, Canada
Filed Aug. 17, 1970, Ser. No. 64,175
Int. Cl. C07c 49/26
U.S. Cl. 260—587
14 Claims

ABSTRACT OF THE DISCLOSURE

An improved process is described for recovering d-isothujone from a mixture containing l-thujone and d-isothujone which comprises contacting such mixture containing at least 35% by weight of d-isothujone with an aqueous bisulfite solution so as to form an adduct of d-isothujone and bisulfite and decomposing the adduct to obtain pure d-isothujone. The thujone mixture preferably contains at least 70% by weight of the two thujones and the ratio of the thujones can be adjusted by isomerization.

BACKGROUND OF THE INVENTION

(1) Field of the invention

This invention relates to the recovery of d-isothujone from a mixture containing l-thujone and d-isothujone.

(2) Description of the prior art

The thujones have long been known and are constituents of many essential oils. In these natural sources the two isomers d-isothujone and l-thujone normally appear together in varying proportions and over the years many attempts have been made to provide commercially useful methods for separating the two.

A relatively recent method which has been described for separating d-isothujone from l-thijone is by fractional distillation (Banthorp et al: J. Chem. Soc. 1968, (B) 1356). However, this is a very difficult process because the difference in boiling points between the two isomers is less than 2° C. and the above report has indicated that in some cases the distillation technique has proved to be quite ineffective.

It has also been known that d-isothujone forms a bisulfite addition compound whereas l-thujone does not form such a compound. The bisulfite adduct was subsequetly decomposed and the d-isothujone isolated. This technique has been used for separating d-isothujone from l-thujone and other terpenes but it has been observed by previous researchers that the behavior of the mixtures of the two thujones and the formation of the adduct of d-isothujone was often accompanied by inexplicable difficulties. These are brought out in various literature sources and particularly in Winn: Ph. D. Thesis, Stanford University, 1959.

In all of the published literature, it is evident that the prior researchers have been unable to solve the problem relating to the difficulties in the separation of the two isomers.

SUMMARY OF THE INVENTION

We have now unexpectedly found that d-isothujone will form a bisulfite addition compound in mixtures of d-isothujone and l-thujone only if the two isomers are present in certain proportions. Thus, we have found that if the d-isothujone is present in the mixture in an amount of at least 35% by weight of the total mixture and the two thujones together constitute at least 70% of the total mixture, the bisulfite addition compound of d-isothujone is consistently formed. If the above minimum concentrations in the mixture are not present, then substantially no bisulfite adduct is formed and as the concentrations are increased above the above mentioned minimum, the yield of adduct quantitatively increases.

DESCRIPTION OF PREFERRED EMBODIMENTS

In order to bring a mixture of l-thujone and d-isothujone into the appropriate proportions to be useful according to the present invention, the mixture can be equilibrated by isomerization with a base. Such a fully equilibrated mixture will contain the thujones in a ratio of about 60–65% d-isothujone to 40–35% l-thujone. For the isomerization, the base is usually used dissolved in an alcoholic solution, preferably in a concentration of 0.1 to 5% in a water soluble aliphatic alcohol. The base itself can be selected from a wide group of materials including alcoholates, hydroxides, carbonates, acetates and weak acid salts of alkali and alkaline earth metals. As these metals, sodium, potassium and calcium are particularly preferred. While the isomerization conditions are in no way critical, they will normally be carried out over a period of time of 5 to 200 minutes at temperatures in the range of about 10–40° C. and a ratio of alcoholic base solution to the thujone mixtures varying from 1:5 to 1:1.

In the formation of the d-isothujone-bisulfite adduct, any water soluble bisulfite may be used. Bisulfite of the alkali metals and ammonium are suitable and sodium bisulfite is normally used. The bisulfite solution should have as high a concentration as possible for the sake of obtaining maximum yield and is preferably used as a saturated solution.

The d-isothujone-bisulfite adduct formation is also preferably carried out in the presence of a suitable buffer, e.g. $NaHCO_3$, and the pH will normally be maintained in a range of about 5.5–7 at temperatures normally in the range of about 10–35° C. The volume ratio of bisulfite solution to the mixture of thujones will normally range from about 1:1 to 0.5:1. This reaction will normally take place within a period of time of about 1 to 24 hours.

After the completion of the formation of the d-isothujone-bisulfite adduct, this is removed from the reaction medium, e.g. by filtering, and is then decomposed to yield pure d-isothujone. The decomposition can be conducted conveniently in an aqueous medium by the action of boiling water or a weak acid. As a weak acid a 5% sulfuric acid solution can be conveniently used and the ratio of the aqueous medium to the bisulfite adduct usually varies from 3:1 to 6:1. The reaction time normally varies from 10 to 90 minutes and is dependent on the nature of the aqueous medium, decreasing with increasing acid concentrations.

The remaining lean solution can then be recycled to the equilibration stage as discussed above to once again adjust the ratios of d-isothujone to l-thujone in the mixture and this equilibrated mixture is then once again subjected to the d-isothujone-bisulfite adduct formation. This cyclic process provides an extremely efficient and easily operated technique for isolating d-isothujone from mixtures containing this with l-isothujone and clearly overcomes all of the previous difficulties.

The process of the present invention is of particular interest for isolating d-isothujone from isomeric mixtures obtained from natural origins such as cedar leaf oil.

In order to illustrate the importance of the amounts of d-isothujone in the isomeric mixture to the present invention, a series of tests were conducted on starting materials containing different amounts of d-isothujone. The results of these tests are shown in Table 1 below:

TABLE 1

| d-Isothujone content in starting mixture, percent weight | d-Isothujone-bisulfite adduct yield, percent of theoretical calculated on available d-isothujone |
|---|---|
| 5.6 | None |
| 30.4 | None |
| 40.0 | 50 |
| 55 | 57 |
| 99 | 100 |

The above results are graphically illustrated in FIG. 2 and particularly from the graph it will be clearly seen that the minimum content of d-isothujone in the starting material is extremely critical to the present invention. Moreover, it will be seen that a relatively high d-isothujone content is particularly desirable for good yields and this emphasizes the importance of the 60–65% d-isothujone content of the equilibrated mixture.

Other experiments were conducted to determine the effects of a cyclic process and the data obtained in a four-step cyclic process is shown in Table 2 below:

TABLE 2

| Step | I | II | III | IV |
|---|---|---|---|---|
| Cedar leaf oil composition: | | | | |
| Percent of thujone | 83.3 | 80.6 | 85.0 | 83.5 |
| l-thujone | 34.6 | 41.9 | 46.6 | 45.5 |
| d-Isothujone | 48.7 | 38.7 | 38.4 | 38.0 |
| Ratio of l-thujone to d-isothujone (as parts of hundred) | 42:58 | 52:48 | 55:45 | 55:45 |
| Bisulfite adduct produced, g | 44 | 6 | 8 | None |

To obtain the above data, cedar leaf oil of the composition given in the column of "Step I" was treated with a saturated sodium bisulfite solution. The recovered, unreacted portion of the composition is given in the column of "Step II." This recovered portion was again treated with sodium bisulfite solution and the composition of the recovered (unreacted) portion is given in column "Step III." After another sodium bisulfite treatment, the recovered oil had the composition given in column "Step IV." This mixture did not form any further bisulfite adduct even after prolonged treatment.

Still other experiments were conducted on the isomerization for equilibration of the reaction mixture. In kinetic measurements, using alcohol as solvent, it was determined that the rates of isomerization were as shown in Table 3 below:

TABLE 3

| Percent NaOH | Percent thujone | Time of equilibration (min.) |
|---|---|---|
| 5.0 | 20 | 10 |
| 2.5 | 20 | 45 |
| 1.0 | 20 | 90 |
| 2.0 | 72 | 180 |

DESCRIPTION OF DRAWINGS

The invention is further illustrated by the attached drawings in which:

As shown in FIG. 1, a stream 1 of a thujone mixture containing not less than 70% by weight of a mixture of d-isothujone and l-thujone enters isomerization reactor 2 where it is contacted with a base in an alcohol solution to equilibrate the mixture. The equilibrated mixture is then transferred via line 4 into reactor 5 where it is contacted with a saturated sulfite solution entering the reactor through line 19. The d-isothujone-bisulfite adduct is gradually formed in reactor 5 and after the formation is complete, the adduct is removed through line 6 into filter 7 together with the unreacted portion of the thujone oil and the aqueous phase.

Figure 1:
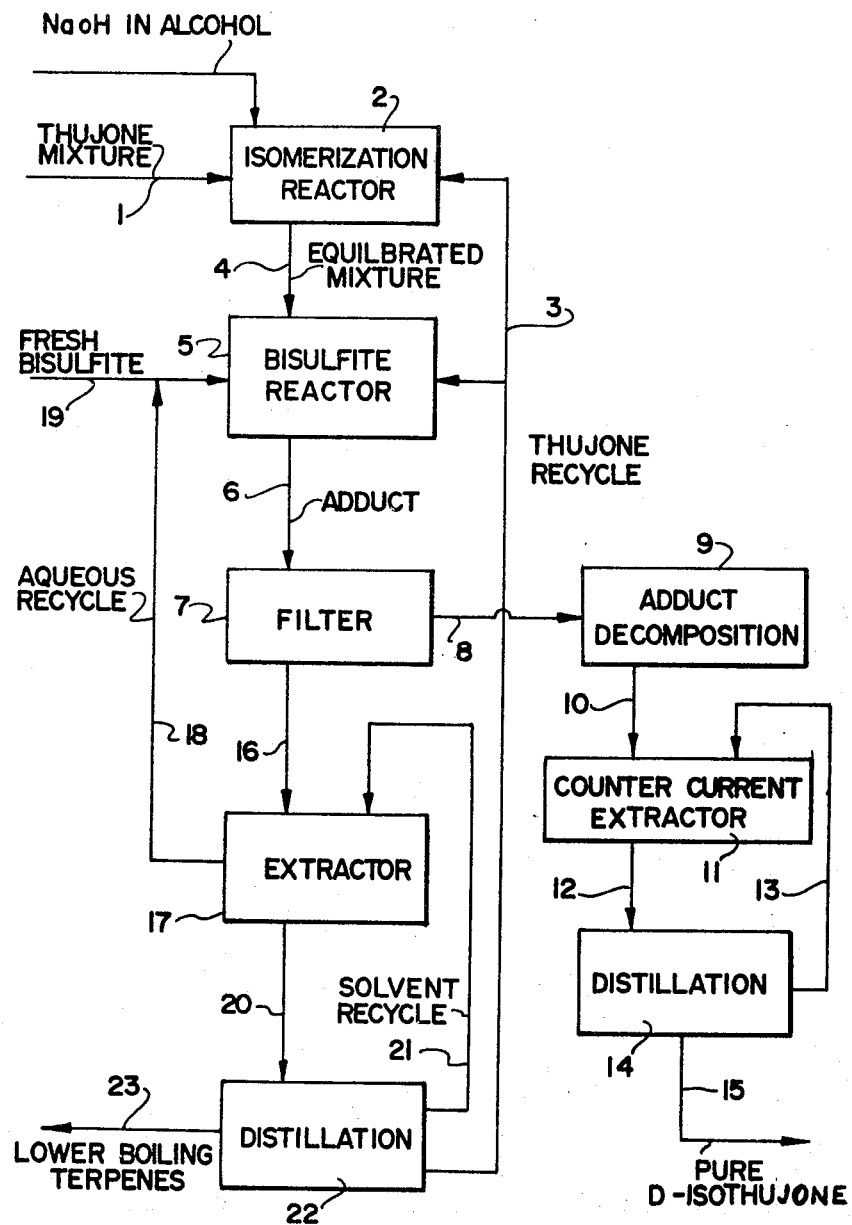
FIG. 1 is a simplified flow diagram of a process according to the invention.
Figure 2:
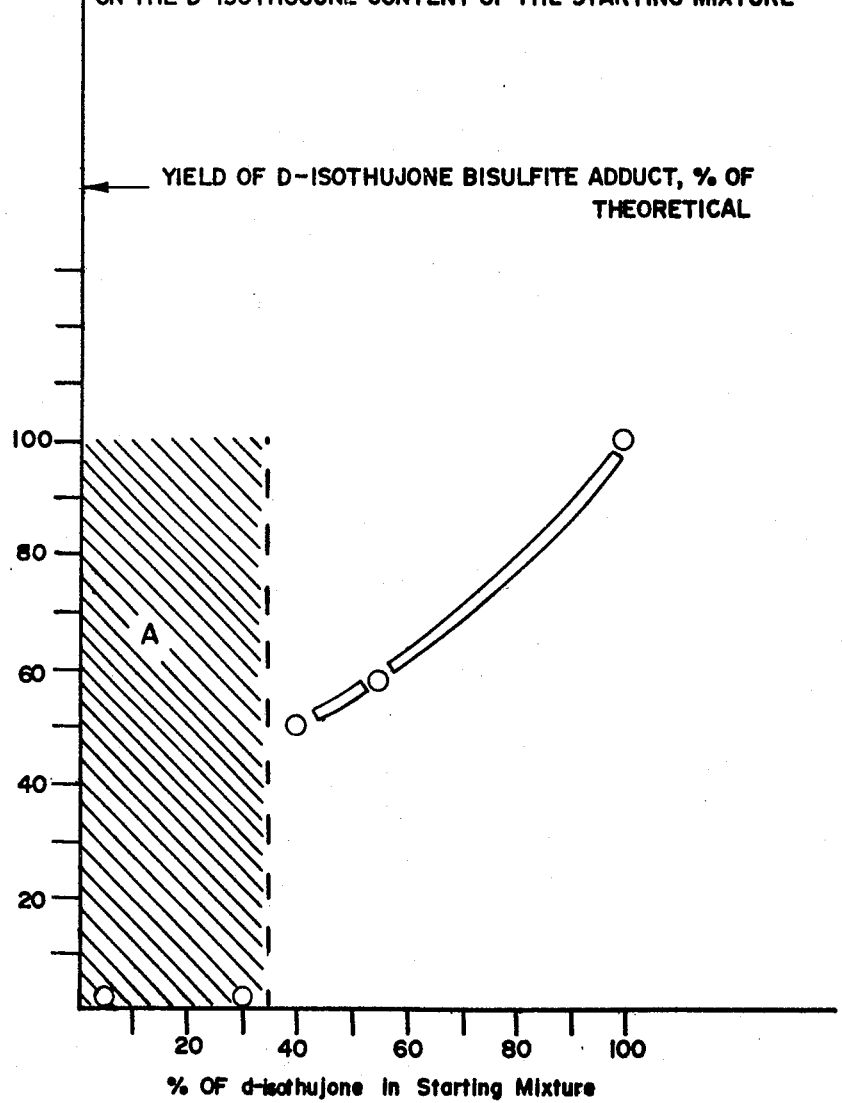
FIG. 2 is a graph showing the relationship between d-isothujone-bisulfite adduct formation and the d-isothujone content of the starting material.

In the filter 7 the solid bisulfite adduct is separated and transferred via line 8 to a reactor 9 where it is decomposed by heating at 100° C. in water containing a small amount of acid. The two-phase system obtained (d-isothujone and water) is then cooled and transferred via line 10 to countercurrent extractor 11. The extract stream 12 obtained from extractor 11 enters a solvent recovery still 14 with the recovered solvent being recycled through line 13 into extractor 11 and the pure d-isothujone removed through discharge outlet 15.

The second stream removed from filter 7 is a liquid two-phase system which travels via line 16 into extraction vessel 17. In this liquid stream the total amount of d-isothujone has been lowered by the amount removed in the formation of the d-isothujone-bisulfite adduct and the content of bisulfite in the aqueous layer has been lowered by the amount used up in the formation of the bisulfite addition compound. This two-phase system is extracted and the aqueous phase is recycled via line 18 where it joins with the fresh bisulfite 19 entering the bisulfite adduct forming reactor 5.

The extract from the extraction vessel 17 travels via line 20 into a solvent recovery still 22. From this still 22, the recovered solvent is recycled through line 21 into extractor 17. Also in still 22 the lower boiling terpenes are distilled off after the solvent removal and are removed via outlet line 23. This allows the maintenance of a constant proportion of total thujones in the remaining thujone mixture in the cyclic process.

The invention is also illustrated by the following working examples which are not intended to limit the scope thereof.

EXAMPLE 1

As starting material there was used a cedar leaf oil containing a total of 89% of the thujone isomers in a ratio of 9 parts l-thujone to 1 part of d-isothujone. 8.1 kg. of this isomeric mixture was mixed with 3.2 l. of a 2.0% sodium hydroxide solution in ethanol. This mixture was held at 30° C. for 120 minutes to complete the isomerization and form an isomeric mixture containing 60–65% d-isothujone and 35–40% l-thujone. Ten liters of a saturated sodium bisulfite solution (containing 6.5 kg. sodium bisulfite) to which 1.2 kg. sodium bicarbonate was added was then mixed with the isomerized mixture and the resulting two-phase system was thoroughly stirred so that an intimate contact of the two phases was assured. After 1 hour, the d-isothujone-bisulfite adduct began to separate as a white crystalline solid containing 2 moles of water. The stirring was continued until the formation of the solid ceased. This reaction was carried out at a temperature between 10 and 35° C.

The speed of the separation of the bisulfite adduct is dependent on trace impurities, temperature, etc., but was found to be completed within 16 hours. About 4.4 kg. of the adduct were subsequently filtered off and washed first with water and then with a suitable water immiscible solvent which acted to remove traces of water insoluble terpenes adhering to the surface of the separated bisulfite addition compound.

Pure d-isothujone was recovered from the bisulfite adduct by heating it in water at 100° C. for 1½ hours. It was also found that by adding a small amount of sulphuric acid, e.g. 5%, to the water, the rate of decomposition of the bisulfite adduct could be considerably accelerated. Thus, with the weak sulphuric acid solution, the decomposition was completed in about 15 to 20 minutes.

The main portion (about 2 kg.) of the d-isothujone formed was separated as a layer and the remainder (0.2 kg.) was separated by exhaustive extraction of the aqueous phase. Based on the weight of the separated d-isothujone-bisulfite adduct, the yield of pure d-isothujone was found to be better than 95%, i.e. about 2.1 kg.

The filtrate after the separation of the solid d-isothujone-bisulfite compound is a two-phase system. The upper layer (approximately 6.0 liters) was found to contain the mixture of thujones. The ratio of d-isothujone to l-thujone was found to have shifted to approximately 45–47% d-isothujone to 53–55% l-thujone. The lower aqueous layer was found to be about 9–10 liters and the bisulfite content in this lower aqueous phase had dropped from 6.5 kg. to approximately 5.0 kg.

The whole system can be extracted with a suitable solvent and from the extract the solvent is distilled off and and recycled into the next extraction. Then the low boiling terpenes are distilled off and separated. Compounds with a boiling point up to 160° C. at 760 mm. are easily separated without any concurrent loss of thujones. This prevents the cyclic system from becoming enriched in these low boiling fractions.

The residue from the distillation containing the thujones is then recycled into the process.

Depending on the amount of d-isothujone and its ratio to l-thujone, the residue is recycled either into the isomerization step (if l-thujone, predominates) or directly into the bisulfite adduct formation step if a sufficient proportion of d-isothujone is still present. The extracted aqueous phase in which the bisulfite content has dropped from 6.5 kg. to 5.0 kg. is adjusted by the addition of fresh sodium bisulfite and recirculated into the adduct formation step.

From the description of the process and the foregoing examples, it will be apparent that by the practice of the present invention an improved commercial process has been provided for the production of d-isothujone from mixtures containing this with l-isothujone. It also shows that the process operates quite satisfactory with mixtures of thujones which may contain other terpenes provided that they do not form a solid bisulfite addition compound.

The process also provides for the equilibration of the thujone mixtures with an arbitrary ratio of the two thujones, thus enabling a manufacture to reach a favorable ratio of the two thujones and permit their recycling in a commercial process.

We claim as our invention:

1. A process for the recovery of d-isothujone from a mixture containing l-thujone and d-isothujone, said mixture containing at least 35% by weight of the d-isothujone and containing at least 70% by weight of the two thujones, the balance being other terpenes and other types of compounds not capable of forming a solid bisulfite adduct, which comprises contacting such mixture with an aqueous bisulfite solution wherein the bisulfite is selected from the group consisting of the bisulfites of alkali metals and ammonium so as to form an adduct of d-isothujone and bisulfite, recovering the adduct from the reaction medium as a solid and decomposing the adduct to obtain d-isothujone.

2. A process according to claim 1 whereint he bisulfite is utilized in the form of a saturated solution.

3. A process according to claim 1 wherein the reaction with the bisulfite is carried out in the presence of a buffer.

4. A process according to claim 1 wherein the bisulfite is sodium bisulfite and the buffer is sodium bicarbonate.

5. A process according to claim 1 wherein the adduct is decomposed by the action of boiling water or a weak acid solution.

6. A process according to claim 1 wherein a mixture containing l-thujone and d-isothujone is isomerized by the action of a base to increase the ratio of d-isothujone to l-thujone.

7. A process according to claim 1 wherein the ratio is adjusted to the range of about 60–65% d-isothujone to 40–35% l-thujone.

8. A process according to claim 6 wherein the base is in an alcoholic solution.

9. A process according to claim 8 wherein the base is selected from an alcoholate, hydroxide, carbonate, acetate and weak acid salt of an alkaline or alkaline earth metal.

10. A process according to claim 7 wherein the metal is selected from sodium, potassium and calcium.

11. A process according to claim 6 wherein the adduct of d-isothujone and bisulfite is removed from the reaction medium as a solid and the remaining liquid is further processed to separate unreacted bisulfite and unreacted thujones.

12. A process according to claim 11 wherein the unreacted bisulfite is recycled to the d-isothujone-bisulfite adduct formation reaction as part of the bisulfite source.

13. A process according to claim 12 wherein the unreacted thujones are recycled to the isomerization reaction as part of the thujone mixtures.

14. A process according to claim 12 wherein the unreacted thujones are recycled to the d-isothujone-bisulfite adduct formation reaction.

References Cited

UNITED STATES PATENTS

| 3,467,649 | 9/1969 | Nano et al. | 260—587 X |
| 3,211,740 | 10/1965 | Stanley et al. | 260—578 X |

LEON ZITVER, Primary Examiner

G. A. SCHWARTZ, Assistant Examiner

U.S. Cl. X.R.

260—503